(12) United States Patent
Marquardt et al.

(10) Patent No.: US 6,359,026 B1
(45) Date of Patent: Mar. 19, 2002

(54) METHOD FOR PRODUCING SILICONE FOAMS

(75) Inventors: Gerwig Marquardt, Odenthal; Thomas Naumann; Helmut Hurnik, both of Leverkusen, all of (DE)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/623,914

(22) PCT Filed: Mar. 18, 1999

(86) PCT No.: PCT/EP99/01797

§ 371 Date: Nov. 22, 2000

§ 102(e) Date: Nov. 22, 2000

(87) PCT Pub. No.: WO99/47591

PCT Pub. Date: Sep. 23, 1999

(30) Foreign Application Priority Data

Mar. 18, 1998 (DE) .......................................... 198 11 485

(51) Int. Cl.⁷ .................................................. C08J 9/00
(52) U.S. Cl. ............................. 522/71; 521/92; 521/95; 521/97; 521/154; 522/81; 522/83; 522/148

(58) Field of Search ............................... 522/71, 81, 83, 522/148; 521/92, 95, 97, 154

(56) References Cited

U.S. PATENT DOCUMENTS

| | | | |
|---|---|---|---|
| 4,026,844 A | | 5/1977 | Kittle et al. |
| 4,704,408 A | * | 11/1987 | Krug et al. .................... 521/88 |
| 5,019,295 A | | 5/1991 | Yoshida et al. |
| 5,438,081 A | | 8/1995 | Lewis et al. |
| 5,482,978 A | * | 1/1996 | Takahashi et al. ............. 521/99 |
| 6,136,874 A | * | 10/2000 | Dyer et al. .................... 521/63 |

FOREIGN PATENT DOCUMENTS

| | | |
|---|---|---|
| EP | 0 497 565 B1 | 1/1992 |
| EP | 0 497 565 A2 | 8/1992 |
| EP | 0 751 173 A1 | 1/1997 |

* cited by examiner

*Primary Examiner*—Morton Foelak

(57) ABSTRACT

The invention relates to a method for producing silicone foams from silicone masses containing ammonium carbonate or ammonium hydrogen or alkali hydrogen carbonates and UHF-active substances, by means of ultra-high frequency waves.

4 Claims, No Drawings

METHOD FOR PRODUCING SILICONE FOAMS

The present invention relates to a process for the production of silicone foams by means of ultrahigh-frequency waves.

Silicone foam materials have been known for some time for various areas of application via various production processes. The manifold areas of application include thermal insulation at elevated temperatures, the production of flexible seals, use as damping elements in the form of foams, inter alia. In these applications, use is made of the known properties of elastic silicone compositions: temperature stability, small change in mechanical properties at varying temperatures, good ageing stability, inter alia.

The various processes for the production of silicone foams are numerous and are used depending on the specific requirements.

Widespread use is made of silicone compositions containing silyl groups which simultaneously eliminate hydrogen during the crosslinking process. Suitable co-reactants are silanol groups, alcohols or even water. The hydrogen formed serves as blowing gas and generates the silicone foam having the desired pore structure, see, for example, EP-A 416 229. A further process is used in the production of silicone foam from heat-vulcanizing, peroxidically crosslinkable siloxane compositions. Here, substances which decompose at elevated temperatures are used as blowing agents which provide the expanded siloxane composition for the moment of vulcanization. This process has experienced widespread acceptance in industry and is described, for example, in U.S. Pat. No. 2,857,343.

Processes have also been described in which use is made of the gas solubility, for example in moisture-curing silicone compositions, in particular at elevated pressure. When the compositions are depressurized, the solubility drops suddenly, and the gas bubbles forming produce the desired silicone foam, which is then crosslinked by, for example, contact with water from atmospheric moisture, see, for example, U.S. Pat. No. 4,229,548.

Of these three systems, only the first allows the production of a solid, voluminous silicone foam; however, this satisfies only very limited demands regarding the mechanical properties, in particular with respect to strength and elasticity.

It has furthermore been attempted to use platinum-catalysed, addition-crosslinking silicone mixtures, in which, as is known, high elasticity and good rubber-mechanical properties can be achieved, to produce silicone foams and moulded silicone foam articles, see EP-A 751 173. The heat necessary to activate the blowing agent and for the vulcanization is supplied externally here, for example using a fan-assisted oven or, in the case of an injection moulding machine, using the heatable mould. A disadvantage here is that the foam volume which can be achieved is limited, since a heat-insulating effect sets in from the outside as the foam begins to form, hindering the passage of further energy inwards and thus excessively slowing or preventing further expansion and vulcanization in the core from a certain foam layer thickness, possibly after 2 to 3 cm. Thicker silicone foam boards or moulded shells, as could be used for thermal insulation at elevated temperatures, could therefore not be produced.

EP-A 497 565 has already described the production of silicone foams by means of ultrahigh-frequency (UHF) waves in the presence of azodicarboxamide as UHF-active substances. However, contamination of the crosslinking system through the use of azodicarboxamide and dinitrosopentamethylenetetramine has been observed (see U.S. Pat. No. 5,246,973).

There was therefore a need for a process for the production of voluminous silicone foams which does not have the disadvantages of the prior art.

Surprisingly, it has now been found that the above object can be achieved extremely well by means of addition- or condensation-crosslinking silicone compositions initiated by UHF waves if they contain certain carbonates and/or hydrogencarbonates and certain UHF-active substances. This combination allows the production, in a short time, of elastic, voluminous silicone foam elements.

The present invention relates to a process for the production of silicone foams by means of ultrahigh-frequency waves, characterized in that the addition- or condensation-crosslinking silicone compositions contain, as constituents, alkali metal and/or ammonium carbonates and/or alkali metal and/or ammonium hydrogencarbonates and UHF-active substances.

In a preferred embodiment of the invention, the addition-crosslinking silicone composition used is a mixture of $a_1$) 100 parts by weight of at least one vinyl group-containing linear or branched organopolysiloxane containing at least 2 vinyl groups and having a viscosity of from 0.1 to 1000 Pa.s, $b_1$) from 3 to 200 parts by weight, preferably from 5 to 50 parts by weight, of at least one, optionally surface-modified filler, $c_1$) from 0.5 to 10 parts by weight, preferably from 1 to 8 parts by weight, of hydrogensiloxane containing at least 3 SiH functions per molecule, $d_1$) from 0.01 to 100 ppm, preferably from 0.03 to 50 ppm, of platinum in the form of a platinum catalyst, $e_1$) from 0.01 to 5 parts by weight, preferably from 0.03 to 3 parts by weight, of an inhibitor.

The vinyl group-containing organopolysiloxanes ($a_1$) are preferably linear or branched organopolysiloxanes containing at last 2 vinyl groups whose viscosity, measured at 20° C. using a rotational viscometer, is in the range from 0.1 to 1000 Pa.s. Particular preference is given to vinyl-terminated polydimethylsiloxanes having a viscosity of from 0.2 to 150 Pa.s, optionally mixed with the dimethylsiloxanes containing pendant vinyl groups.

All viscosity data were measured at 20° C. in accordance with DIN 53 019.

Examples of fillers ($b_1$) are extender fillers, such as, for example, quartz sand or cristobalite flour and, precipitated or pyrogenic silicas, whose surface is preferably treated, before or during the mixing process, with substances known per se, such as, for example, silazanes, with or without addition of water.

Component $b_1$) is preferably finely divided pyrogenic or precipitated silica, which has optionally been surface-modified with hexamethyldisilazane and/or tetramethyldivinyldisilazane.

For the purposes of the invention, component $c_1$) comprises known polyorganosiloxanes carrying hydrogen atoms on at least three silicon atoms, such as, for example, compounds of the formula

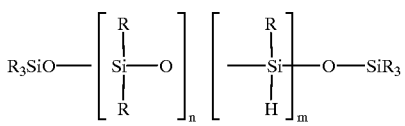

where R=$C_1$–$C_8$ alkyl or $C_6$–$C_8$ aryl, m is=3, and m+n=3–1000, and where the —$SiOR_2$ and —SiRHO units are randomly distributed in the molecule.

The Pt catalyst ($d_1$) is preferably a Pt complex which catalyzes the adduction of Si—H groups onto vinylsiloxanes. Preference is therefore given to Pt(0) complexes containing vinylsiloxanes as ligands. However, it is also possible to use other metal complexes, such as, for example, Rh compounds. Preference is given to Pt(0) complexes containing vinylsiloxane ligands which are soluble in the siloxane polymers.

Suitable inhibitors ($e_1$) are all compounds which permit a targeted reduction in the crosslinking rate, but do not cause irreversible damage to the catalyst. Particular preference is given to short-chain or cyclic polydimethylsiloxanes containing a plurality of adjacent vinyl groups on the silicon atoms, such as, for example, tetramethyldivinyldisiloxane, ethinylcyclohexanol and/or tetramethyltetravinylcyclotetrasiloxane as component c).

In a further embodiment of the invention, the condensation-crosslinking silicone composition used is a mixture of $a_2$) 100 parts of a linear or branched organopolysiloxane containing at least two silanol groups, where the viscosity is preferably in the range from 100 to 1,000,000 mPa.s, $b_2$) from 3 to 200 parts, preferably from 5 to 50 parts, of at least one filler which has optionally been surface-modified, $c_2$) from 1 to 15 parts by weight of a silane crosslinking agent selected from the series consisting of carboxamide-eliminating silanes of the formula $CH_3Si(OC_2H_5)X_2$, where X is either $C_6H_5CON(CH_3)$— or

or
oxime-eliminating silanes of the formula

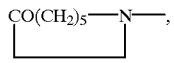

where $R_3$ is an alkyl or alkenyl radical having 1 to 4 carbon atoms, $R_1$ and $R_2$ can each be an alkyl radical having 1 to 4 carbon atoms or hydrogen, or $R_1$ and $R_2$ together are an alkylene radical having 4 or 5 carbon atoms, and where a can adopt the value 0 or 1, or carboxylic acid-eliminating silanes of the formula

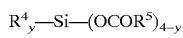

where y=0 or 1, where $R^4$ is a saturated or unsaturated hydrocarbon radical having 1 to 10 carbon atoms, and $R^5$ is a monovalent hydrocarbon radical having 1 to 10 carbon atoms.

The viscosity of the linear or branched organopolysiloxane a2) was measured at 20° C. in accordance with DIN 53 019. The organopolysiloxane usually consists of dimethylsiloxane units, but other organic radicals may also be introduced. The organopolysiloxane is furthermore terminated by silanol groups, but other arrangements or more than two silanol groups per molecule can also be used.

The optionally surface-modified filler $b_2$) is highly dispersed or precipitated silica and/or precipitated chalk and/or finely divided quartz sand. It is also possible for fibres, metal powder and/or plastic powder to be present. The optional surface treatment can be carried out using, for example, hexamethyldisilazane or dirmethyldichlorosilane. The BET surface area in $m^2$/g has been taken from the manufacturer and is usually measured by $N_2$ absorption.

The condensation-crosslinking mixture may also contain further additives. The most important of these are catalysts which regulate the crosslinking rate, examples which may be mentioned being organotin compounds, such as, for example, dibutyltin acetate, titanium compounds or zirconium compounds. Also customary, if desired, are adhesion promoters, such as, for example, aminoalkylalkoxysilanes or butoxyacetoxysilanes, plasticizing silicone oils or hydrocarbons, fungicides, flame inhibitors, stabilizers for oxidation and heat protection, such as, for example, iron oxides, and dyes.

Furthermore, the reinforcing fillers, such as silica or carbon black, and the extender fillers, such as silicates and quartz sand, can also be varied within broad limits.

The ammonium carbonate, ammonium hydrogencarbonate or alkali metal hydrogencarbonate used in accordance with the invention, where alkali metal is preferably Na or K, is added to both the condensation-crosslinking and the addition-crosslinking mixtures in finely divided form. The particle size is preferably=50 μm, preferably=40 μm, particularly preferably=20 μm, where the mean particle size is determined by counting and averaging (number average) by means of a light microscope using a calibrated scale. The addition can either be in pure form as a powder with subsequent intensive mixing or by addition of a batch prepared by mixing the carbonate with, for example, a diorganopolysiloxane as per a).

The abovementioned carbonates and/or hydrogencarbonates in accordance with the invention are preferably used in an amount of from 0.2 to 10 parts by weight, preferably from 0.5 to 6 parts by weight, the amount being determined by the desired degree of foaming.

The UHF-active substances used are graphite, carbon blacks, preferably electroconductive blacks, iron oxide, magnesium oxide and/or aluminium hydroxide. In the case of the addition-crosslinking mixture, the UHF-active substances can also be used in the form of a water-containing filler and/or water-containing zeolite.

The UHF-active substances can also be further substances of sufficiently high dielectric constant and sufficiently large dissipation factor at the frequency used.

UHF wave (microwave) generators are widespread and customary in the rubber and plastics industry. It is also possible to use standard equipment produced for kitchen use. The microwave frequency is usually in the range from $1000 \cdot 10^6$ Hz to $5725 \cdot 10^6$ Hz, the frequency $2450 \cdot 10^6$ Hz being frequently used in industry. However, it is also possible to use high-frequency waves in the range from $13.56 \cdot 10^6$ Hz to $40.68 \cdot 10^6$ Hz.

The duration of the UHF wave treatment is highly dependent on the activity of the UHF-active substance used. It can be in the range from, for example, 10–20 sec up to 10–20 minutes or more, the input power per unit weight of product to be foamed being of crucial importance. It is also possible to use a power gradient and/or to combine microwaves with thermal energy.

Both the addition- and condensation-crosslinking compositions may also contain further additives, such as, for example, coloured pigments or additives for increasing the flame resistance, such as, for example, carbon black or $TiO_2$.

In the case of addition-crosslinking silicone compositions, the mixture is usually prepared also [sic] dividing the premix into two components, one containing the platinum catalyst and the inhibitor and the other containing the hydrogensiloxane crosslinking agent. These two components can be stored separately. The admixture of the carbonate and the UHF-active substance can take place either after mixing of the two components or to one of the two components before mixing. The full mixture is then exposed to the UHF waves for foaming.

In the case of the condensation-crosslinking mixture, stirring-in of the carbonate and/or hydrogencarbonate is preferably delayed until just before the foaming. The UHF-active substance may already be present in the carbonate-free premix, but can also be incorporated together with the carbonate and/or hydrocarbonate together [sic] or just after the dienes.

The examples below, in which all parts are parts by weight, explain the invention without representing a limitation.

WORKING EXAMPLES

Example 1

The base mixture was prepared in a dissolver by mixing 5.0 kg of vinyl-terminated polydimethylsiloxane (polymer type $a_1$) having a viscosity of 10 Pa.s at 20° C., and 8.0 kg of vinyl-terminated polydimethylsiloxane $a_1$) having a viscosity of 65 Pa.s at 20° C. with 3.3 kg of hexamethyldisilazane and 0.7 kg of water and subsequently with 6 kg of pyrogenic silica having a BET surface area of 300 m$^2$/g (measured by $N_2$ absorption) to give a homogeneous composition (incorporation of the filler in accordance with DE-A 2 535 334). The mixture was first warmed to 130° C. and stirred for 1.5 h in the sealed dissolver and then freed from water and other volatile constituents at 160° C. in vacuo. After this base mixture for the preparation of component A had been cooled, it was mixed with 12.0 kg of polymer type a and with 0.01 kg of a tetramethyltetravinylcyclotetrasiloxane containing 15% of Pt in the form of a Pt complex (corresponding to 22 ppm of Pt in the total formulation A+B) containing tetramethyltetravinylcyclotetrasiloxane as ligand.

To prepare component B, a base mixture was prepared with the same amounts as above, but with 10.0 kg of polymer type $a_1$), 0.03 kg of ethinylcyclohexanol $e_1$) and 2.7 kg of a trimethylsilyl-terminated polymethylhydrogensiloxane $c_1$) containing on average 10 methylhydrogensiloxy units and 20 dimethylsiloxy units per molecule.

200 g of each of the two components A and B were removed and mixed intensively with 32 g of a mixture of 6 parts of the abovementioned polymer of type $a_1$) having a viscosity of 10 Pa.s and 4 parts of finely divided ammonium hydrogencarbonate.

The mean particle size of the $NH_4HCO_3$, determined by counting and averaging by means of a light microscope using a calibrated scale, was 15 µm.

120 g of a carbon black batch consisting of 10 parts of an electroconductive black (commercially available from Degussa, Germany, under the name Printer XE 2, average primary particle size 30 nm) and 90 parts of a polydimethylsiloxane of type $a_1$) having a viscosity of 10 Pa.s were then incorporated.

400 g of this total mixture were transferred into a 2l beaker which had been prepared in advance using a Teflon spray as anti-adhesion agent.

This beaker was exposed to UHF wave radiation in a commercially available kitchen microwave oven. The power of 700 W was applied for 4 minutes. The foaming process began after only half a minute, and after 2 minutes the foam volume in the hot state was 1800 ml, from a starting volume of about 360 ml. Since the surface was still tacky, the power was increased to 900 W for 5 minutes until they were no longer tacky. Due to the cooling action of the glass, the crosslinking cannot take place adequately at the edges, so external heating in a fan-assisted oven for 15 minutes at 200° C. was carried out. After cooling, the foam cylinder with a height of 14 cm and a diameter of 12 cm (foam factor about 4.4) was easy to demould. A section showed a homogeneous foam structure. The foam could not be set on fire using a lighter flame and exhibited good thermal stability at a storage temperature of 300° C.

Example 2

50 g of each of the two components A and B were removed and mixed intensively with 7.5 g of a mixture of 6 parts of the vinyl-terminated polymer (type $a_1$) having a viscosity of 10 Pa. s at 20° C. and 4 parts of finely divided ammonium hydrogencarbonate (particle size, see Example 1). 10 g of graphite ("synthetic special graphite" from FUH, Walluf, Germany) were then admixed , and the platinum content was increased, by means of the Pt catalyst mentioned under Example 1, to give a total Pt content of 28 ppm. 20 g of the resultant graphite-containing, ammonium hydrogen-containing [sic] mixture were distributed over the base of a hollow Teflon cylinder (diameter 55 mm, height 30 mm) and exposed to UHF waves with a power of 900 watts for 10 minutes. An extremely fine-pored silicone foam having very good elastic properties and a foam factor of about 5 slowly formed. The foam could not be set on fire using a match flame.

Example 3

66 parts of an α,ω-dihydroxypolydimethylsiloxane having a viscosity of 50 Pa.s and 21.1 parts of an α,ω-bis (trimethylsiloxy)polydimethylsiloxane having a viscosity of 1 Pa.s were mixed in a planetary mixer.

As fillers, 4.3 parts of a pyrogenically produced silica surface-treated with hexamethyldisiloxane (BET surface area 150 m$^2$/g) and 4.3 parts of a pyrogenically produced silica (BET surface area 150 m$^2$/g) were successively stirred-in in portions.

The air that had been stirred in was removed by evacuation, and, after aeration, 4.0 parts of ethyltriacetoxysilane and 0.08 part of dibutyltin acetate were added with stirring. 0.5 part of an adhesive consisting of tertiary butoxyacetoxysilanes containing predominantly dibutoxydiacetoxysilane were then incorporated.

100 parts of the resultant mixture were mixed with 40 parts of a carbon black batch consisting of 10 parts of an electroconductive black (commercially available from Degussa, Germany, under the name Printex XE2, average primary particle size 30 mm, manufacturer's data) and 90 parts of a polydimethylsiloxane of type $a_1$) having a viscosity of 10 Pa.s. 4 parts of a finely divided ammonium hydrogencarbonate were also mixed in, the average particle size being 15 μm. 30 g of the resultant carbon black-containing and ammonium hydrogen-containing [sic] mixture were distributed over the base of a hollow Teflon cylinder (diameter 55 mm, height 30 mm) and exposed to UHF waves at a power of 600 W for 20 minutes.

A homogeneous siloxane foam having a foam factor of about 4 formed.

Example 4

80 parts of an α,ω-dihydroxypolydimethylsiloxane $a_2$) having a viscosity of 50 Pa.s were mixed with 10 parts of a finely divided iron oxide (commercially available under the name Bayferrox 303T, manufacturer Bayer AG, Germany, average particle size 0.6 μm according to the manufacturer) in a planetary mixer. 4 parts of vinylbutanone oximinosilane $c_2$) were incorporated, and pyrogenically produced silica (BET surface area 110m$^2$/g) which had been hydrophobicized by means of dimethyldichlorosilane was stirred-in in portions.

1 part of the adhesive aminopropyltriethoxysilane was then added. Finely divided ammonium hydrogencarbonate (average particle size 15 μm) was then added to this mixture in such an amount that a 3% homogeneous composition was formed. Of this, 6.6 g were distributed over the base of a hollow Teflon cylinder (diameter 55 [lacuna], height 30 mm) and exposed to UHF waves at a power of 600 W for 20 minutes. A silicone foam element having a foam factor of 4 and a homogeneous foam structure formed.

What is claimed is:

1. A process for the production of silicone foam comprising: applying ultrahigh-frequency waves to an addition-crosslinking or condensation-crosslinking silicone composition, said silicone compostion comprising:
    (a) from 0.2 to 10 parts by weight of a finely divided component having an average particle size of <50 μm and comprising one or more of alkali metal carbonates, ammonium carbonates, alkalai metal hydrogencarbonates and ammonium hydrogencarbonates, and
    (b) one or more UHF-active substances selected from graphite, carbon blacks, electroconductive blacks, iron oxides, magnesium oxide and aluminum hydroxide.

2. A process according to claim 1, the wherein addition-crosslinking silicone composition comprising
    $a_1$) 100 parts by weight of at least one vinyl group-containing linear or branched organopolysiloxane containing at least 2 vinyl groups and having a viscosity of from 0.1 to 1000 Pa.s,
    $b_1$) from 3 to 200 parts by weight of at least one, optionally surface-modified filler,
    $c_1$) from 0.5 to 10 parts by weight of hydrogensiloxane containing at least 3 SiH functions per molecule,
    $d_1$) from 0.01 to 100 ppm of platinum in the form of a platinum catalyst,
    $e_1$) from 0.01 to 5 parts by weight of an inhibitor.

3. A process according to claim 1, the wherein condensation-crosslinking silicone composition comprising
    $a_2$) 100 parts of a linear or branched organopolysiloxane containing at least two silanol groups, where the viscosity is in the range from 100 to 1,000,000 mPa.s,
    $b_2$) from 3 to 200 parts of at least one filler which has optionally been surface-modified,
    $c_2$) from 1 to 15 parts by weight of a silane crosslinking agent selected from the series consisting of carboxamide-eliminating silanes of the formula $$CH_3Si(OC_2H_5)X_2,$$

where X is either $C_6H_5CON(CH_3)$— or $$\underset{\phantom{xx}}{CO(CH_2)_5\!-\!\!-\!\!N\!\!-\!\!-},$$

or oxime-eliminating silanes of the formula $$R_x^3Si\!-\!\!\left[O\!-\!\!N\!=\!C\!\!\begin{array}{c}R^1\\ \\R^2\end{array}\right]_{4-x},$$

where $R_3$ is an alkyl or alkenyl radical having 1 to 4 carbon atoms, $R_1$ and $R_2$ can each be an alkyl radical having 1 to 4 carbon atoms or hydrogen, or $R_1$ and $R_2$ together are an alkylene radical having 4 or 5 carbon atoms, and where a can adopt the value 0 or 1, or
carboxylic acid-eliminating silanes of the formula $$R^4{}_y\!-\!\!Si\!-\!\!(OCOR^5)_{4-y}$$

where y=0 or 1,
where $R^4$ is a saturated or unsaturated hydrocarbon radical having 1 to 10 carbon atoms,
and $R^5$ is a monovalent hydrocarbon radical having 1 to 10 carbon atoms.

4. A process according to claim 1, wherein the alkali metal and/or ammonium carbonates and/or hydrogencarbonates have an average particle size of <40 μm.

* * * * *